United States Patent
Shin et al.

(10) Patent No.: US 11,808,894 B2
(45) Date of Patent: Nov. 7, 2023

(54) LIDAR DEVICE USING TIME DELAYED LOCAL OSCILLATOR LIGHT AND OPERATING METHOD THEREOF

(71) Applicant: SAMSUNG ELECTRONICS CO., LTD., Suwon-si (KR)

(72) Inventors: Dongjae Shin, Seoul (KR); Hyunil Byun, Seongnam-si (KR); Jinmyoung Kim, Hwaseong-si (KR); Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 410 days.

(21) Appl. No.: 17/158,732

(22) Filed: Jan. 26, 2021

(65) Prior Publication Data

US 2022/0066005 A1    Mar. 3, 2022

(30) Foreign Application Priority Data

Aug. 27, 2020    (KR) .......................... 10-2020-0108528

(51) Int. Cl.
| | |
|---|---|
| *G01C 3/08* | (2006.01) |
| *G01S 7/4911* | (2020.01) |
| *G01S 17/32* | (2020.01) |
| *G01S 17/931* | (2020.01) |

(52) U.S. Cl.
CPC ............. *G01S 7/4911* (2013.01); *G01S 17/32* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 7,683,308 B2 | 3/2010 | Charbon et al. | |
| 7,719,029 B2 | 5/2010 | Itzler | |
| 7,986,397 B1 | 7/2011 | Tiemann et al. | |
| 8,040,586 B2 | 10/2011 | Smith et al. | |
| 8,767,190 B2 | 7/2014 | Hall | |
| 9,110,158 B2 | 8/2015 | Habif | |
| 9,632,216 B2 | 4/2017 | Han et al. | |
| 10,132,928 B2 | 11/2018 | Eldada et al. | |
| 10,613,410 B2 | 4/2020 | Hosseini et al. | |

(Continued)

FOREIGN PATENT DOCUMENTS

| | | |
|---|---|---|
| EP | 1 118 876 A2 | 7/2001 |
| EP | 3 627 184 A1 | 3/2020 |

(Continued)

OTHER PUBLICATIONS

Communication dated Jul. 16, 2021, issued by the European Patent Office in European Application No. 21156214.5.

*Primary Examiner* — Mark Hellner
(74) *Attorney, Agent, or Firm* — Sughrue Mion, PLLC

(57) ABSTRACT

A light detection and ranging (LiDAR) device includes a transmitter configured to transmit a continuous wave light to an object and provide a local oscillator (LO) light corresponding to the transmitted continuous wave light; a delay circuit configured to time delay the LO light; a receiver configured to receive the continuous wave light reflected from an object; and a detection circuit configured to determine a distance from the LiDAR device to the object based on the time delayed LO light and the received continuous wave light.

15 Claims, 15 Drawing Sheets

(56) References Cited

U.S. PATENT DOCUMENTS

| | | |
|---|---|---|
| 2014/0232827 A1 | 8/2014 | Kumar et al. |
| 2015/0378011 A1 | 12/2015 | Owechko |
| 2016/0209499 A1 | 7/2016 | Suzuki |
| 2016/0302010 A1 | 10/2016 | Sebastian et al. |
| 2017/0074974 A1 | 3/2017 | Rao et al. |
| 2017/0180658 A1 | 6/2017 | Choi et al. |
| 2017/0301716 A1 | 10/2017 | Irish et al. |
| 2018/0031681 A1 | 2/2018 | Yoon et al. |
| 2018/0210071 A1 | 7/2018 | Bash et al. |
| 2019/0187257 A1 | 6/2019 | Otsuka et al. |
| 2019/0331797 A1* | 10/2019 | Singer .................... G01S 7/497 |
| 2019/0383596 A1 | 12/2019 | Thorpe et al. |
| 2019/0391459 A1 | 12/2019 | Shin et al. |
| 2020/0049819 A1 | 2/2020 | Cho et al. |
| 2020/0103679 A1 | 4/2020 | Lee et al. |
| 2020/0174104 A1 | 6/2020 | Kim et al. |
| 2021/0293959 A1* | 9/2021 | Park ....................... G01S 7/487 |

FOREIGN PATENT DOCUMENTS

| | | | |
|---|---|---|---|
| EP | 3627184 A1 * | 3/2020 | ............ G01S 7/481 |
| JP | 2017-161484 A | 9/2017 | |
| KR | 10-2012-0020890 A | 3/2012 | |
| KR | 10-2019-0036704 A | 4/2019 | |
| KR | 10-2020-0037639 A | 4/2020 | |
| KR | 10-2020-0066947 A | 6/2020 | |
| WO | 2018/128662 A2 | 7/2018 | |

\* cited by examiner

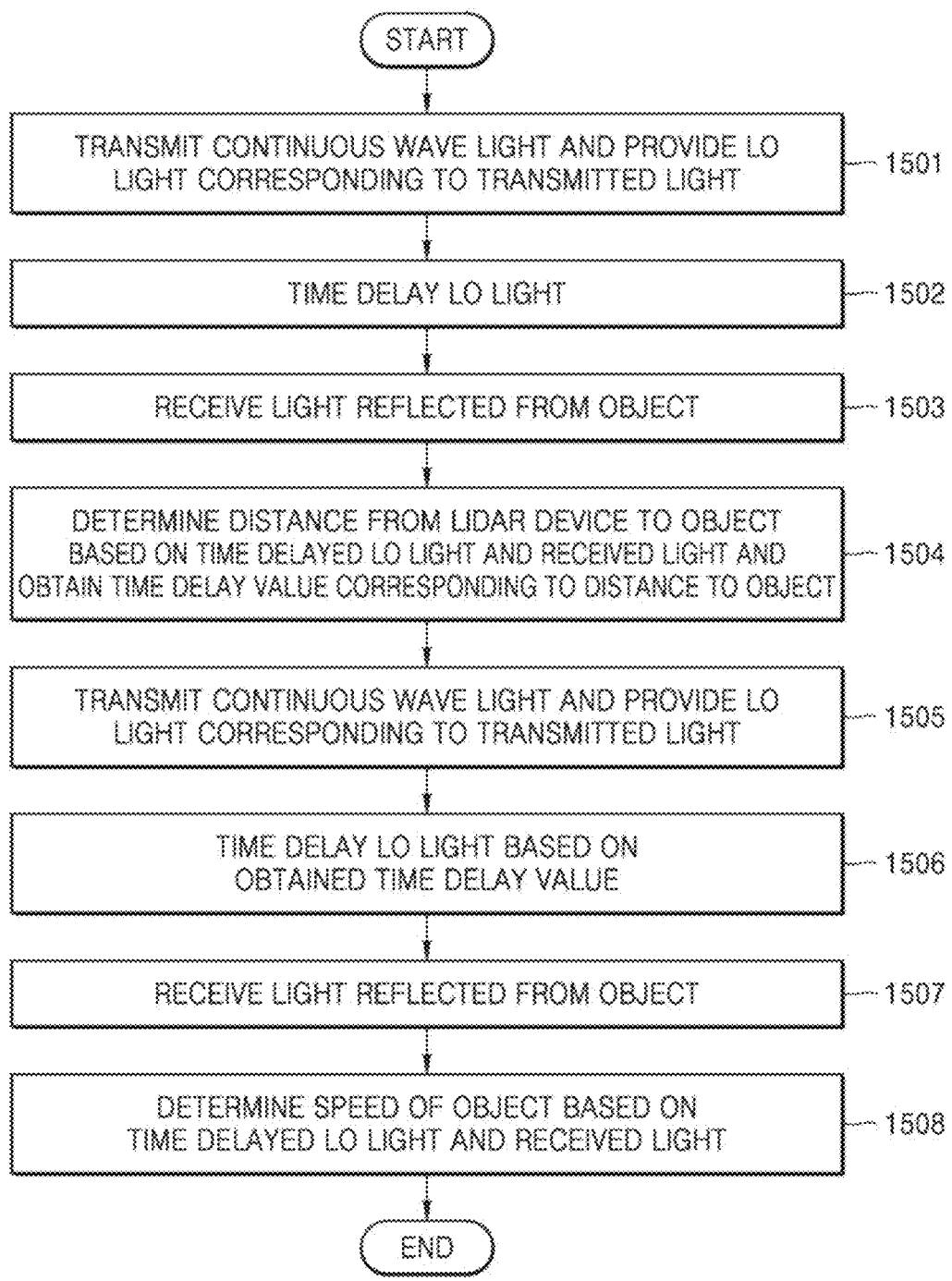

LIDAR DEVICE USING TIME DELAYED LOCAL OSCILLATOR LIGHT AND OPERATING METHOD THEREOF

CROSS-REFERENCE TO RELATED APPLICATION

This application is based on and claims priority to Korean Patent Application No. 10-2020-0108528, filed on Aug. 27, 2020, in the Korean Intellectual Property Office, the disclosure of which is incorporated by reference herein in its entirety.

BACKGROUND

1. Field

Apparatuses and methods consistent with example embodiments relate to a light detection and ranging (LiDAR) device using a time delayed local oscillator (LO) light and an operating method thereof.

2. Description of Related Art

Representative methods of detecting a range include a Time of Flight (ToF) method and a Frequency Modulated Continuous Wave (FMCW) method. In the ToF method, a range is detected by analyzing a transmitted pulse and a received pulse in the time domain. In the FMCW method, a range is detected by analyzing a transmitted continuous wave and a received continuous wave in the frequency domain.

In the ToF method, because the pulse covers a wide frequency band, a wideband receiver needs to be used, which makes it difficult to suppress noise. In the FMCW method, because the accuracy depends on the linearity of a frequency chirp of the continuous wave, it is difficult to implement a LiDAR device at low cost in light of a very high frequency of several hundred terahertz (THz) that is used in generating the FMCW method.

SUMMARY

Example embodiments provide LiDAR devices using a time delayed LO light and operating methods thereof. The technical problem to be achieved by the present embodiment is not limited to the above technical problems, and other technical problems may be inferred from the following examples.

Additional aspects will be set forth in part in the description which follows and, in part, will be apparent from the description, or may be learned by practice of the presented embodiments of the disclosure.

According to an aspect of an example embodiment, there is provided a light detection and ranging (LiDAR) device including: a transmitter configured to transmit a continuous wave light to an object, and provide a local oscillator (LO) light corresponding to the transmitted continuous wave light; a delay circuit configured to time delay the LO light; a receiver configured to receive the continuous wave light reflected from an object; and a detection circuit configured to determine a distance from the LiDAR device to the object based on the time delayed LO light and the received continuous wave light.

The delay circuit may be further configured to change an amount of a time delay by which the LO light is delayed.

The delay circuit may be further configured to stepwise increase an amount of a time delay by which the LO light is delayed, from a minimum delay value to a maximum delay value.

The continuous wave light may include a non-linear frequency modulated continuous wave light, and the transmitter may include: a light source; and a frequency modulator configured to control the light source to generate a frequency chirp signal including the non-linear frequency modulated continuous wave light.

The transmitter may further include a light source configured to generate a light, and a splitter configured to split the light generated by the light source into the continuous wave light and the LO light and provide the LO light to the delay circuit.

The detection circuit may include a mixer configured to output an interfered light by interfering the time delayed LO light with the received continuous wave light.

The detection circuit may further include a signal converter configured to output an electrical signal by photoelectrically converting the interfered light.

The detection circuit may further include a processor configured to determine the distance from the LiDAR device to the object based on the electrical signal.

The processor may be configured to generate a filtered signal by filtering the electrical signal via a high pass filter (HPF), obtain a time delay value of the time delayed LO light corresponding to a period in which the filtered signal is reduced to a predetermined value or a minimum value, and determine the distance from the LiDAR device to the object based on the obtained time delay value.

The detection circuit may be further configured to determine a speed of the object based on a time delay value of the time delayed LO light and the received continuous wave light.

According to an aspect of an example embodiment, there is provided an operating method of a light detection and ranging (LiDAR) device, the operating method including: transmitting a continuous wave light to an object and providing a local oscillator (LO) light corresponding to the transmitted continuous wave light; time delaying the LO light; receiving the continuous wave light reflected from the object; and determining a distance from the LiDAR device to the object based on the time delayed LO light and the received continuous wave light.

The time delaying the LO light may include: time delaying the LO light by changing an amount of a time delay by which the LO light is delayed.

The time delaying the LO light may include: time delaying the LO light by stepwise increasing an amount of a time delay by which the LO light is delayed, from a minimum delay value to a maximum delay value.

The time delaying the LO light may include: performing a plurality of delay operations on the LO light with a time delay value increasing by a unit delay value from a minimum delay value to a maximum delay value, and wherein at least one of the minimum delay value, the maximum delay value, and the unit delay value of a delay operation of the plurality of delay operations may be different from at least one of the minimum delay value, the maximum delay value, and the unit delay value of another delay operation of the plurality of delay operations.

The time delaying the LO light may include: time delaying the LO light with a first time delay value increasing by a unit delay value from a first minimum delay value to a first maximum delay value; and time delaying the LO light in time with a second time delay value increasing by the unit delay value from a second minimum delay value to a second maximum delay value. The unit delay value may be proportional to a difference between the first minimum delay value and the second minimum delay value.

The time delaying the LO light may include: time delaying the LO light by a first time delay value increasing by a first unit delay value from a first minimum delay value to a first maximum delay value; and time delaying the LO light by a second time delay value increasing by a second unit delay value from a second minimum delay value to a second maximum delay value. A second difference between the second maximum delay value and the second minimum delay value may be less than a first difference between the first maximum delay value and the first minimum delay value, or the second unit delay value is less than the first unit delay value.

The determining the distance from the LiDAR device to the object may include: obtaining an interfered light by interfering the time delayed LO light with the received continuous wave light; obtaining an electrical signal by photoelectrically converting the interfered light; and determining the distance from the LiDAR device to the object based on the electrical signal.

The determining the distance from the LiDAR device to the object based on the electrical signal may include: obtaining a filtered signal by filtering the electrical signal; and determining the distance from the LiDAR device to the object based on the filtered signal.

The determining the distance from the LiDAR device to the object based on the filtered signal may include: obtaining a time delay value of the time delayed LO light corresponding to a period in which the filtered signal is reduced to a predetermined value or a minimum value; and determining the distance from the LiDAR device to the object from the obtained time delay value.

According to an aspect of an example embodiment, there is provided a light detection and ranging (LiDAR) device including: a light source; a frequency modulator configured to control the light source to produce a non-linear continuous wave light; a beam splitter configured to split the non-linear continuous wave light into a transmission light and a local oscillator (LO) light; an optical delay circuit configured to time delay the LO light by stepwise increasing a delay time of the LO light; one or more antennas configured to emit the transmission light to an object and receive a reflected light from the object when the transmission light is reflected from the object; and a detection circuit configured to determine a distance from the LiDAR device to the object based on the time delayed LO light and the reflected light.

The optical delay circuit may be further configured to: perform a first delay operation, a second delay operation, and a third delay operation on the LO light by stepwise increasing the delay time by a first unit time, a second unit time, and a third unit time, respectively, and output an interfered light by interfering the time delayed LO light with the reflected light. The LiDAR device may further include a processor configured to: detect a first delay time during which the interfered light has a first local minimum value in the first delay operation, a second delay time during which the interfered light has a second local minimum value in the second delay operation, and a third delay time during which the interfered light has a third local minimum value in the third delay operation; determine a global minimum value from the first local minimum value, the second local minimum value, and the third local minimum value, and determine the distance from the LiDAR device to the object based on the first delay time, the second delay time, or the third delay time during which the global minimum value is obtained.

The second unit time, and the third unit time may be equal to each other. The optical delay circuit may be further configured to: perform the first delay operation from a first minimum delay value to a first maximum delay value; perform the second delay operation from a second minimum delay value to a second maximum delay value; and perform the third delay operation from a third minimum delay value to a third maximum delay value. The first minimum delay value, the second minimum delay value, the third minimum delay value may be different from each other, and the first maximum delay value, the second maximum delay value, and the third maximum delay value may be different from each other.

The first unit time, the second unit time, and the third unit time may be different from each other, and the optical delay circuit may be further configured to: perform the first delay operation from a first minimum delay value to a first maximum delay value; perform the second delay operation from a second minimum delay value to a second maximum delay value; and perform the third delay operation from a third minimum delay value to a third maximum delay value, and wherein a second range from the second minimum delay value to the second maximum delay value may be within a first range from the first minimum delay value to the first maximum delay value, and a third range from the third minimum delay value to the third maximum delay value may be within the second range.

BRIEF DESCRIPTION OF THE DRAWINGS

The above and/or other aspects will be more apparent by describing certain example embodiments, with reference to the accompanying drawings, in which:

FIG. 15 is a flowchart illustrating a method, performed by a LiDAR device, of detecting a speed and a distance according to an example embodiment.

DETAILED DESCRIPTION

Figure 1:
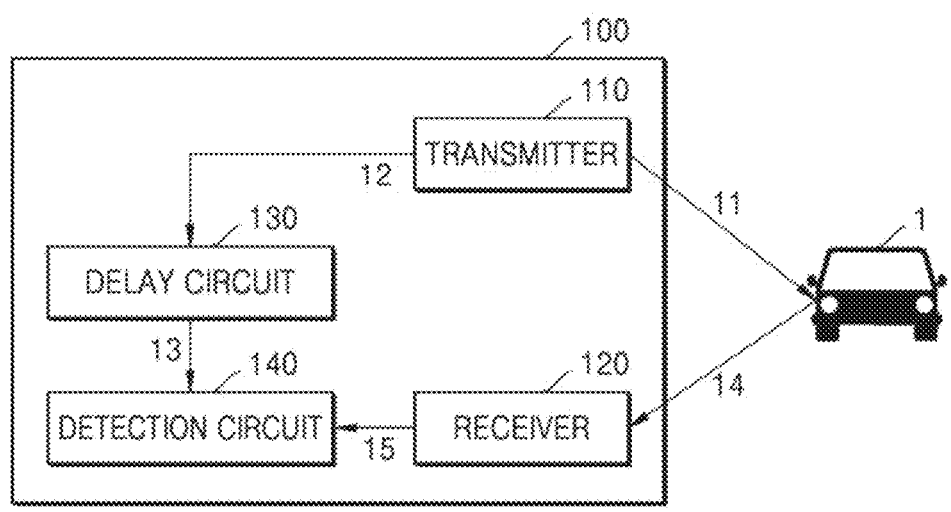
FIG. 1 is a block diagram illustrating a LiDAR device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected based on general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

Terms such as "including" or "comprising" used in the embodiments should not be construed as necessarily including all of various components, or various operations described in the specification, and it should be construed that some of the components or some of the operations may not be included or may further include additional components or operations.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a block diagram illustrating a LiDAR device 100 according to an example embodiment.

Referring to FIG. 1, in an example embodiment, the LiDAR device 100 includes a transmitter 110, a receiver 120, a delay circuit 130, and a detection circuit 140. The transmitter 110 and the receiver 120 may be integrated into and implemented by a transceiver.

The LiDAR device 100 may be used in various fields requiring a range detection. For example, the LiDAR device 100 may be used in aerospace, geology, three-dimensional (3D) maps, vehicles, robots, drones, etc. For example, the LiDAR device 100 may be mounted on vehicles, airplane, portable devices, or observation equipment.

In an example embodiment, the transmitter 110 is configured to transmit a continuous wave light 11 and to provide a local oscillator (LO) light 12 corresponding to the transmitted light 11. The receiver 120 is configured to receive a reflected light 14 obtained when the transmitted light 11 is reflected from an object 1. The delay circuit 130 is configured to time delay the LO light 12. The detection circuit 140 is configured to determine a distance to the object 1 based on the time delayed LO light 13 and a received light 15.

Figure 2:
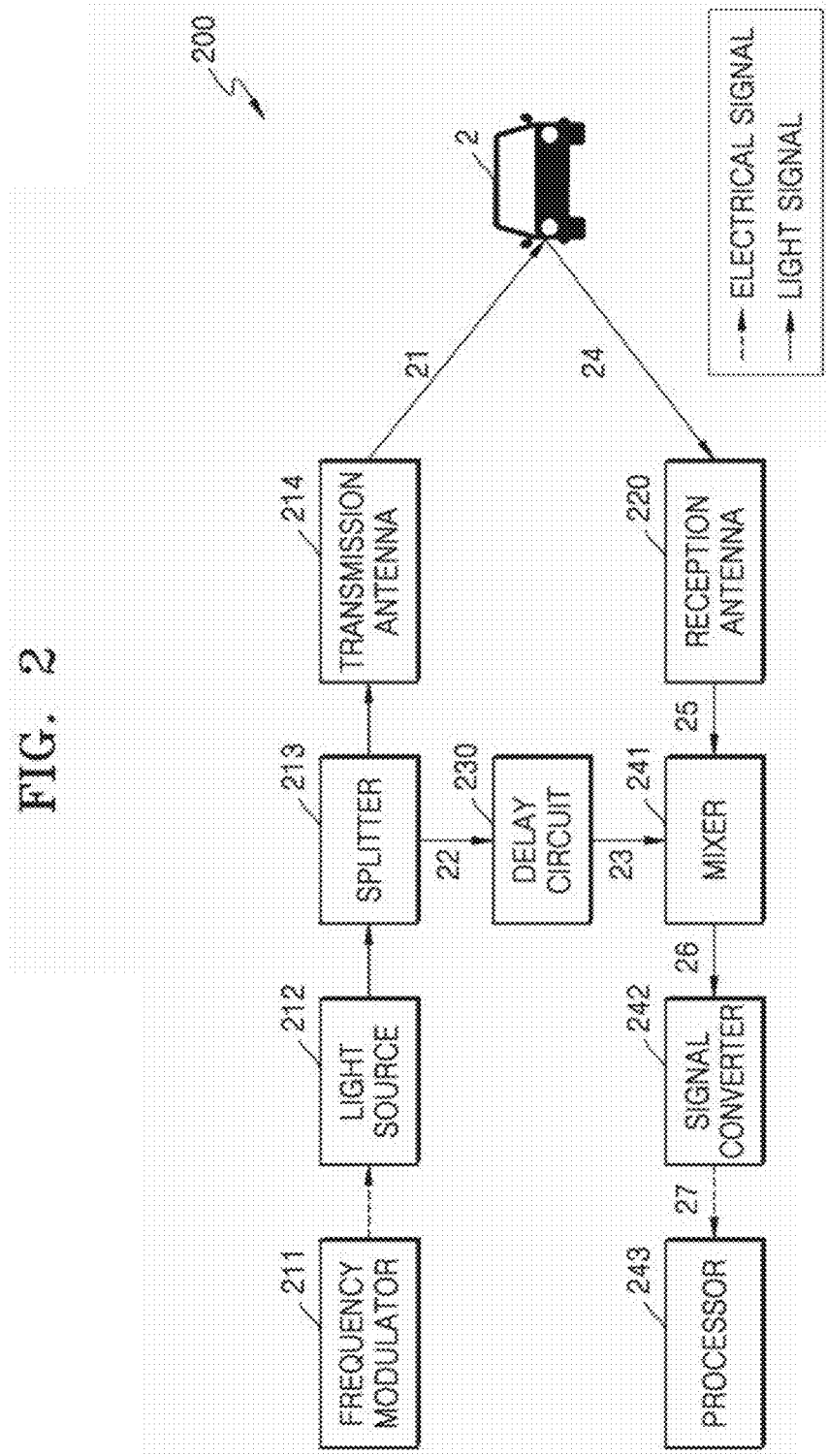
FIG. 2 is a block diagram illustrating a LiDAR device according to an example embodiment.

FIG. 2 is a block diagram illustrating a LiDAR device 200 according to an example embodiment.

In an example embodiment, the LiDAR device 200 includes a frequency modulator 211, a light source 212, a splitter (or a beam splitter) 213, a transmission antenna 214, a reception antenna 220, a delay circuit 230, a mixer 241, a signal converter 242, and a processor 243.

The frequency modulator 211, the light source 212, the splitter 213, and the transmission antenna 214 may be included in the transmitter 110 of FIG. 1. The reception antenna 220 may be included in the receiver 120 of FIG. 1. The delay circuit 230 may correspond to the delay circuit 130 of FIG. 1. The mixer 241, the signal converter 242, and the processor 243 may be included in the detection circuit 140 of FIG. 1. FIGS. 1 and 2 merely illustrate the embodiments of the LiDAR devices 100 and 200, respectively, and it is obvious to those skilled in the art that a LiDAR device different from those of FIGS. 1 and 2 may be implemented in another embodiment.

The light source 212 is configured to continuously oscillate to generate, for example, a continuous wave light having a waveform such as a sine wave. The continuous wave light may have a frequency band of several hundreds of terahertz (THz) or a wavelength of nanohertz (nm). For example, the continuous wave light may have a wavelength of about 800 nm to about 2,000 nm. However, the present disclosure is not limited thereto, and the light source 212 may be configured to generate light in various frequency bands, and may be configured to simultaneously generate light in different frequency bands.

The frequency modulator 211 may be configured to control driving of the light source 212. For example, the frequency modulator 211 may control driving of the light source 212 by applying a control signal to the light source 212. The light source 212 may be controlled by the frequency modulator 211 to generate a frequency modulated continuous wave light.

The frequency modulator 211 may control the light source 212 such that the light generated from the light source 212 is an arbitrary frequency chirp signal. The arbitrary frequency chirp signal may include a non-linear frequency modulated continuous wave light.

Figure 3:
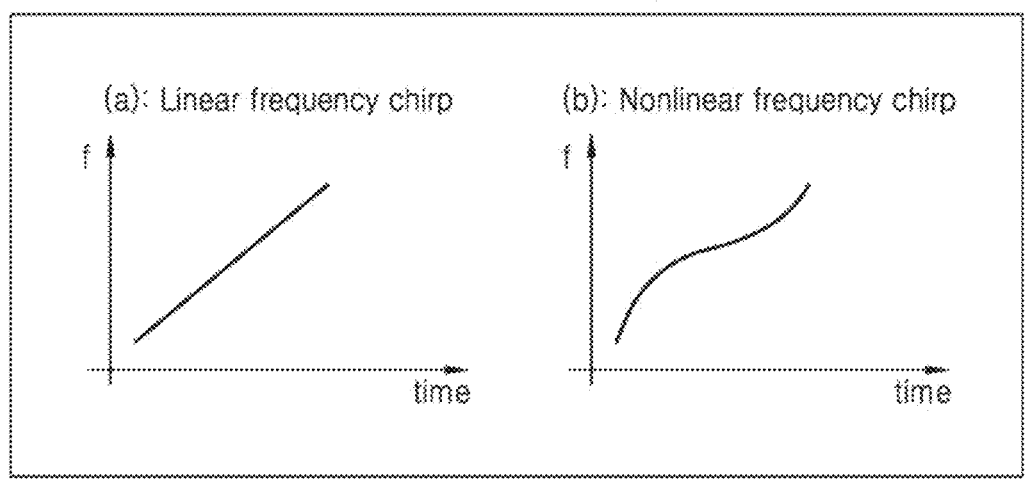
FIG. 3 is a diagram illustrating an arbitrary frequency chirp according to an example embodiment.

FIG. 3 is a diagram illustrating an arbitrary frequency chirp according to an example embodiment.

Referring to FIG. 3, a frequency chirp means a phenomenon in which the frequency of light continuously changes with time. A frequency chirp signal means an optical signal whose frequency continuously changes according to a signal. The frequency of the chirp signal may increase or decrease with time, and may be also referred to as a sweep signal.

A linear frequency chirp means a phenomenon in which the frequency of light changes linearly with time as shown in the graph (a) of FIG. 3. The nonlinear frequency chirp means a phenomenon in which the frequency of light changes nonlinearly with time as shown in the graph (b) of FIG. 3.

The arbitrary frequency chirp means a phenomenon in which the frequency of light continuously changes with time, and includes a linear frequency chirp and a nonlinear frequency chirp. In other words, the arbitrary frequency chirp signal means an optical signal whose frequency continuously changes with time.

In some cases, the arbitrary frequency chirp signal may be interpreted as an optical signal in which the frequency of light continuously increases with time, but is not limited thereto.

Referring back to FIG. 2, because light has a frequency of several hundreds of THz, it is difficult to implement the light to be a linear frequency chirp signal by using a voltage controlled oscillator (VCO) and a phase locked loop (PLL) used for a radio frequency (RF) signal. Thus, the VCO and the PLL may not be suitable for optical signals and optical-signal-based LiDAR devices. In addition, an optical phase locked loop (OPLL) has low technological maturity.

In an example embodiment, the frequency modulator 211 is configured to control the light source 212 such that the light generated by the light source 212 is the arbitrary frequency chirp signal. That is, the frequency modulator 211 and the light source 212 are not restricted to limited conditions such as the condition that the light generated from the light source 212 is the linear frequency chirp signal. Thus, in an example embodiment, the frequency modulator 211 and the light source 212 need not be configured to generate the linear frequency chirp signal.

Part of the light split by the splitter 213 is provided to the transmission antenna 214 and the other part, that is, the LO light 22, is provided to the delay circuit 230. The light 21 transmitted by the transmission antenna 214 is reflected from the object 2 and is received by the reception antenna 220.

The delay circuit 230 is configured to time delay the LO light 22. The time delayed LO light 23 is provided from the delay circuit 230 to the mixer 241.

Figure 4:
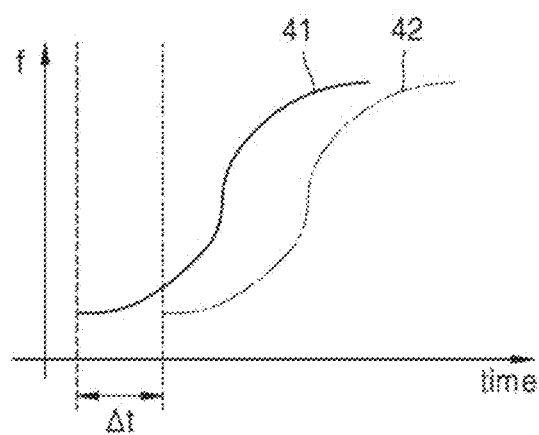
FIG. 4 is a diagram illustrating a local oscillator (LO) light and a time delayed LO light according to an example embodiment.

FIG. 4 is a diagram illustrating an LO light 41 and a time delayed LO light 42 according to an example embodiment.

The time delayed LO light 42 is the same frequency chirp signal that is time shifted compared to the LO light 41. That is, the time delayed LO light 42 and the LO light 41 have a time difference by a time delay value $\Delta t$, but have the same frequency or have substantially the same frequency.

Referring back to FIG. 2, in an example embodiment, the delay circuit 230 is configured to change a time delay value for time delaying the LO light 22. The range of the time delay value of the delay circuit 230 may be nanoseconds (ns) to milliseconds (ms), but is not limited thereto.

The delay circuit 230 may be a circuit configured to delay light based on an optical fiber, tunable optical delay lines, or silicon photonics included in the delay circuit 230, but is not limited thereto. The delay circuit 230 may be also referred to as a tunable optical delay circuit.

The delay circuit 230 may be a circuit configured to program the time delay value, but is not limited thereto. For example, the delay circuit 230 may be configured such that the time delay value is programmed by an external device.

Alternatively, the delay circuit 230 may be configured to change the time delay value based on a received input signal, but is not limited thereto. For example, the input signal may be provided from the processor 243 or an external device.

The signal converter 242 may be configured to convert an optical signal into an electrical signal. For example, the signal converter 242 may include at least one of a photodiode (PD), an avalanche photodiode (APD), and a single photo avalanche diode (SPAD), but is not limited thereto.

In an example embodiment, the mixer 241 is configured to interfere the time delayed LO light 23 with a received light 25. A light 26 interfered by the mixer 241 may be converted into an electrical signal 27 by the signal converter 242. The signal converter 242 may generate the electrical signal 27 as an analog signal or may generate the electrical signal 27 by digital sampling using an analog-digital converter (ADC).

In an example embodiment, the processor 243 is configured to determine the distance to the object 2 based on the electrical signal 27. The processor 243 may be configured to determine the distance to the object 2 by processing an analog signal or the electrical signal 27 that is a digital signal sampled in a time domain. The processor 243 may be configured to filter the electrical signal 27 with a high pass filter (HPF) and determine the distance to the object 2 based on the filtered signal. The processor 243 may be configured to determine the distance to the object 2 by obtaining a ToF from the time delay value corresponding to a period in which the filtered signal is reduced.

The processor 243 may be implemented as an array of a plurality of logic gates, or may be implemented as a combination of a general-purpose microprocessor and a memory in which a program executable in the microprocessor is stored. Further, the processor 243 may include both a filter filtering a signal and a signal processor processing the filtered signal.

Figure 5:
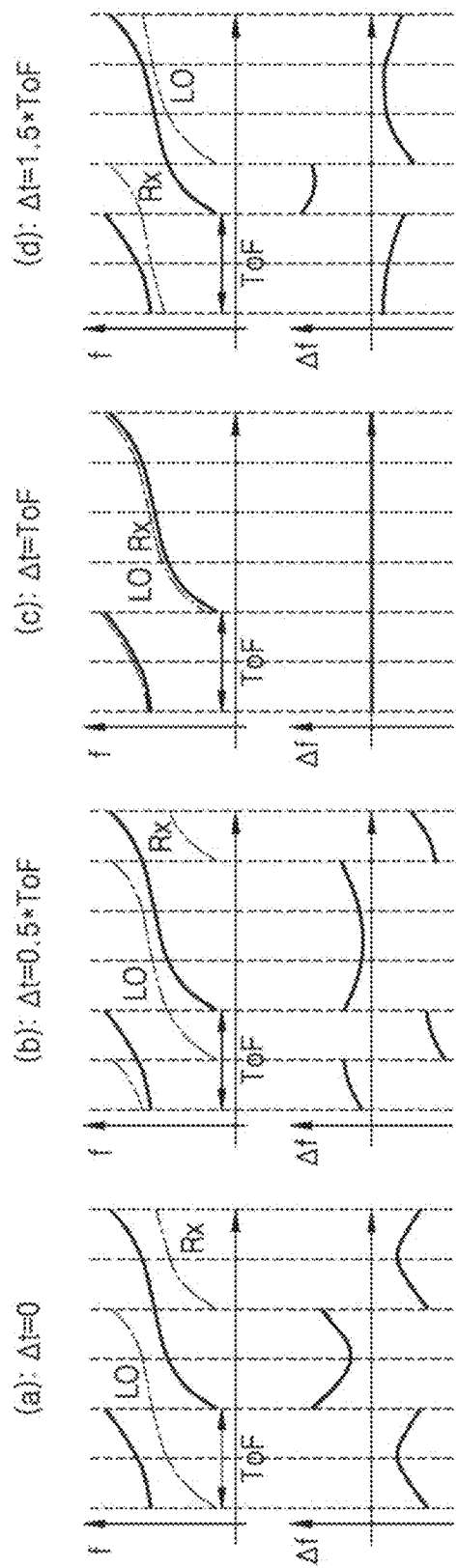
FIG. 5 is a diagram illustrating an operating principle of a LiDAR device to detect a distance according to an example embodiment.

FIG. 5 is a diagram illustrating a principle that a LiDAR device detects a distance according to an example embodiment.

FIG. 5 shows graphs of an LO light time delayed by different time delay values $\Delta t$ and a received light Rx.

Graph (a) shows the time delayed LO light having the time delay value $\Delta t$ of 0 and the received light Rx. Graph (b) shows the time delayed LO light having the time delay value $\Delta t$ of 0.5 times of ToF and the received light Rx. Graph (c) shows the time delayed LO light having the time delay value $\Delta t$ that is the same or substantially the same as that of ToF and the received light Rx. Graph (d) shows the time delayed LO light having the time delay value $\Delta t$ of 1.5 times of ToF and the received light Rx.

As described with reference to FIG. 4, even though the LO light passes through the delay circuit, there is no change in the frequency. In addition, when an object is not moving, a change in the frequency does not occur in the reflected light. Accordingly, as shown in the graph (c), when the time delay value $\Delta t$ is the same or substantially the same as ToF, a component of a beat frequency $\Delta f$ obtained from the interfered light may disappear. Here, the beat frequency $\Delta f$ may mean a difference between the frequency of the time delayed LO light and the frequency of the received light Rx.

As shown in graphs (a), (b), and (d), when the time delay value $\Delta t$ is different from ToF, the component of the beat frequency $\Delta f$ obtained from the interfered light may exist.

In a period where the component of the beat frequency $\Delta f$ disappears, a high frequency component of the signal is reduced. Accordingly, ToF, that is, the distance to the object, from the time delay value $\Delta t$ corresponding to the period in which the high frequency component of the signal is reduced may be determined.

Figure 6:
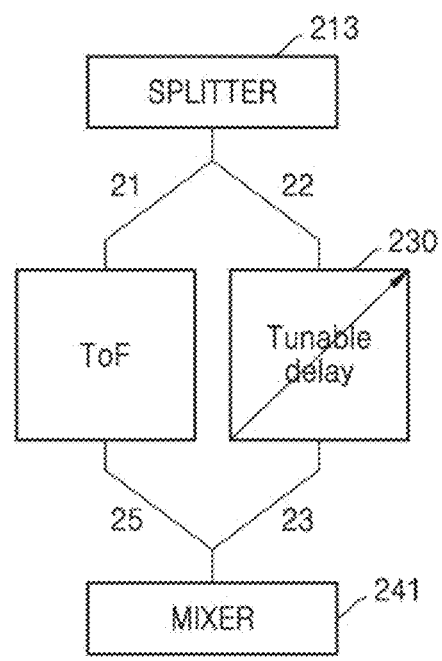
FIG. 6 is a diagram illustrating an operating principle of a LiDAR device according to an example embodiment.

FIG. 6 is a diagram illustrating an operating principle of a LiDAR device according to an example embodiment.

The light 21 split by the splitter 213 and transmitted out of the LiDAR device toward an object is received by the LiDAR device after a ToF. The ToF may represent a time taken by the light emitted from the LiDAR device to travel from the LiDAR device to the object and then from the object to the LiDAR. The delay circuit 230 generates the time delayed LO light 23 by time delaying the LO light 22. The mixer 241 interferes the received light 25 with the time delayed LO light 23.

When the delay circuit 230 delays the LO light by the ToF, because a component of a beat frequency of the interfered light disappears, a high frequency component of an electric signal is reduced. Accordingly, by appropriately changing a time delay value of the delay circuit 230, a period in which the high frequency component of the electric signal is reduced may be detected, and the distance to the object may be determined.

Figure 7:
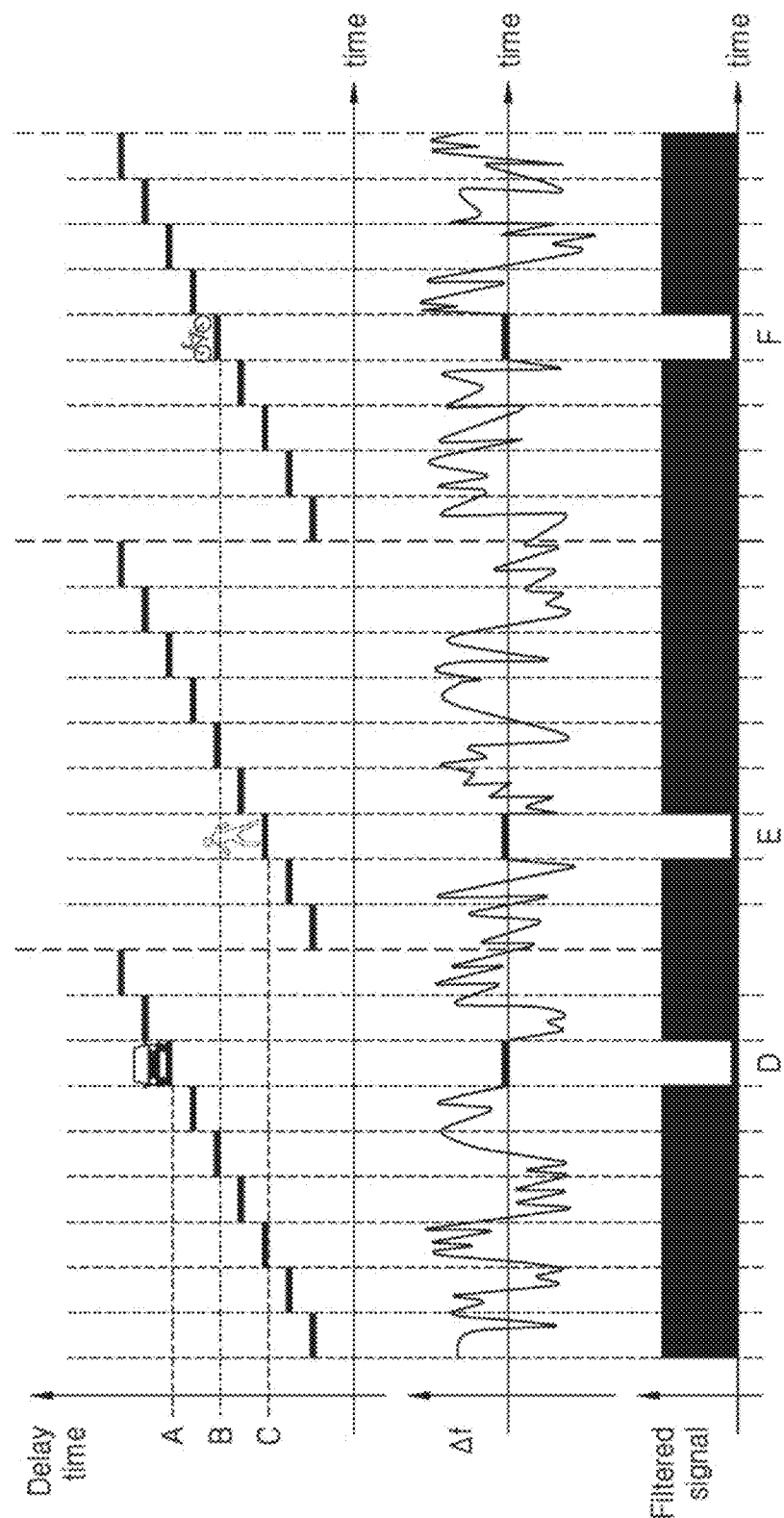
FIG. 7 is a diagram illustrating a method, performed by a LiDAR device, of measuring a distance according to an example embodiment.

FIG. 7 is a diagram illustrating a method, performed by the LiDAR device, of measuring a distance according to an example embodiment.

Referring to FIGS. 2 and 7, the delay circuit 230 changes a time delay value and generates the time delayed LO light 23. The mixer 241 interferes the time delayed LO light 23 with the received light 25 to provide the interfered light 26 to the signal converter 242. The signal converter 242 provides the electrical signal 27 generated from the interfered light 26 to the processor 243.

The processor 243 may filter the electrical signal 27 using a high pass filter (HPF) to generate a filtered signal. When the time delay value is ToF, because a component of the beat frequency $\Delta f$ of the interfered light 26 disappears, a high frequency component of the electrical signal 27 is reduced and the filtered signal is reduced. Accordingly, when a period in which the filtered signal is reduced (e.g., a period in which the filtered signal is reduced to a predetermined value, a local minimum value, or a global minimum value) is detected, the time delay value corresponding to the detected period may be obtained, and the ToF and the distance to an object may be determined from the obtained time delay value. Accordingly, the processor 243 may analyze the filtered signal in a time domain to determine the distance from the LiDAR device to the object.

The processor 243 may detect the period in which the filtered signal is reduced. For example, the processor 243 may compare the magnitude of the filtered signal with a pre-determined value to detect the period in which the filtered signal is reduced. Alternatively, the processor 243 may determine whether the magnitude of the filtered signal is smaller than the pre-determined value to detect the period in which the filtered signal is reduced. Alternatively, the processor 243 may determine whether an average value of the magnitude of the filtered signal is smaller than the pre-determined value to detect the period in which the filtered signal is reduced. Alternatively, the processor 243 may determine the period in which the filtered signal is reduced from a period in which the magnitude of the filtered signal is the minimum. Alternatively, the processor 243 may determine the period in which the filtered signal is reduced from a period in which the average value of the magnitude of the filtered signal is the minimum.

FIG. 7 shows an example embodiment in which the distance to a vehicle, a person, and a bicycle is determined.

When the distance to the vehicle is determined, D is the period in which the filtered signal is reduced. The processor 243 may determine the distance from a time delay value A corresponding to the period D to the vehicle.

Similarly, when the distance to the person is detected, E is the period in which the filtered signal is reduced. The processor 243 may determine the distance from the time delay value C corresponding to the period E to the person.

Similarly, when the distance to the bicycle is detected, F is the period in which the filtered signal is reduced. The processor 243 may determine the distance from the time delay value B corresponding to the period F to the bicycle.

Because the processor 243 determines the distance to the object by analyzing the filtered signal in the time domain, the LiDAR device 200 according to an example embodiment may not require components (for example, Fast Fourier Transform (FFT) circuit, etc.) for analyzing a signal in a frequency domain.

Figure 8:
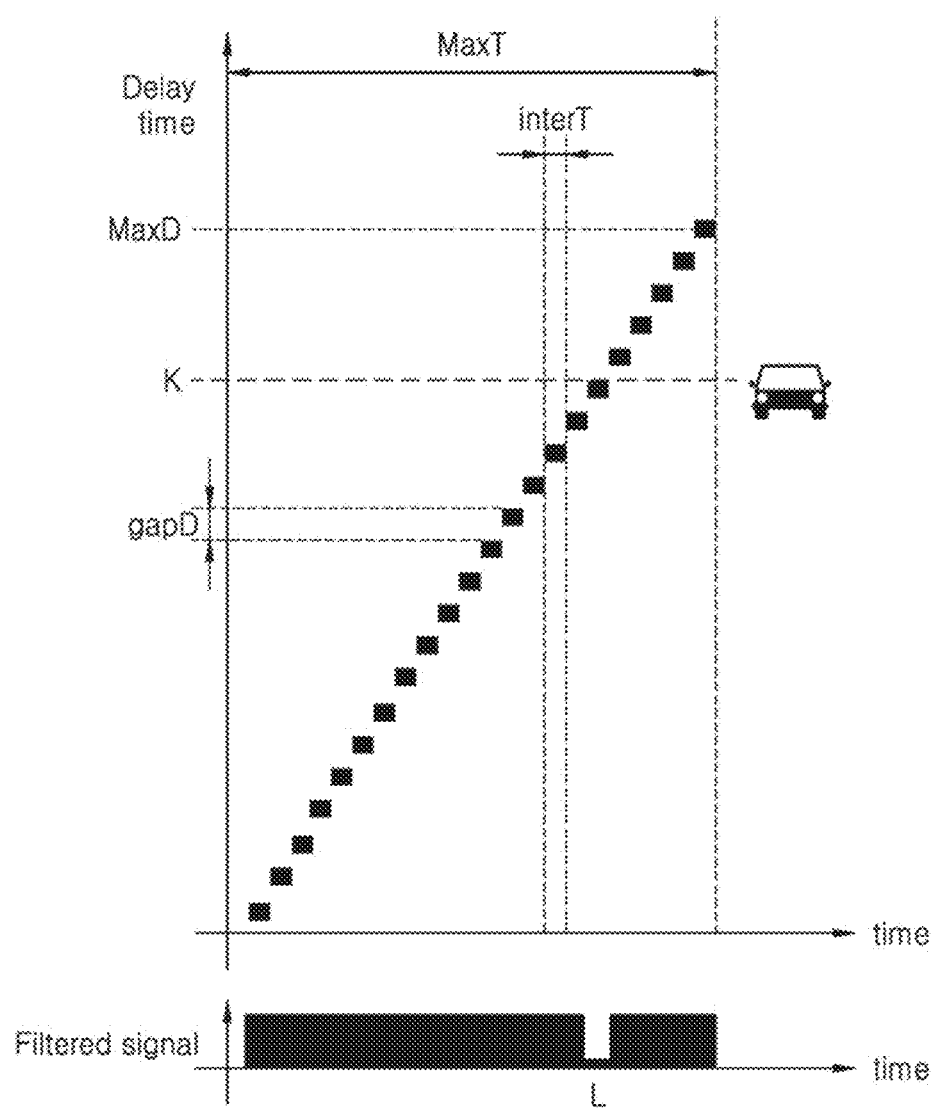
FIG. 8 is a diagram illustrating a method, performed by a LiDAR device, of measuring a distance and a time delay value according to an example embodiment.

FIG. 8 is a diagram illustrating a method, performed by a LiDAR device, of measuring a distance and a time delay value according to an example embodiment.

The time delay value of the LiDAR device may be determined based on the performance of the LiDAR device.

A maximum measurable distance MaxR of the LiDAR device is considered. ToF corresponding to the maximum measurable distance MaxR is 2*MaxR/c, and the time delay value is 2*MaxR/c. A distance resolution $\Delta R$ of the LiDAR device is considered. The time delay value corresponding to the distance resolution $\Delta R$ is 2*$\Delta R$/c. Here, c is the speed of light.

Therefore, in order to satisfy the performance of the LiDAR device, the time delay value needs to be controlled in an interval of 2*$\Delta R$/c in the range of 0-2*MaxR/c. For example, when the maximum measurable distance MaxR of the LiDAR device is 200 m and the distance resolution $\Delta R$ is 10 cm, the time delay value needs to be controlled in an interval of 0.66 ns in the range of 0 to 1.33 μs.

In an example embodiment, the LiDAR device may be configured to increase the time delay value by an equal amount at a time from the minimum delay value to the maximum delay value MaxD in a unit delay value gapD.

The maximum delay value MaxD may be determined based on the maximum measurable distance MaxR of the LiDAR device. The unit delay value gapD may be determined based on the distance resolution $\Delta R$ of the LiDAR device. The minimum delay value may be determined based on the minimum value of the distance to be measured. For example, the maximum delay value MaxD may be determined as 2*MaxR/c, and the unit delay value gapD may be determined as 2*$\Delta R$/c. For example, when the maximum measurable distance MaxR of the LiDAR device is 200 m and the distance resolution $\Delta R$ is 10 cm, the maximum delay value MaxD may be determined as 1.33 μs and the unit delay value gapD may be determined as 0.66 ns. That is, the time delay value may be determined to increase by 0.66 ns from 0 to 1.33 μs.

The processor may determine the distance to an object, based on a time delay value K corresponding to a period L in which a filtered signal is reduced to a predetermined value, a local minimum value, or a global minimum value. For example, when the time delay value K is 0.66 μs (=0.66 ns*1000), because the ToF is obtained as 0.66 μs, the distance to the object may be determined to be about 99 m (=0.66 μs*c/2).

A unit delay period interT in which the time delay value is constant may be determined as (delay period MaxT)/(maximum delay value MaxD-minimum delay value)*(unit delay value gapD). In this regard, the delay period MaxT is a period in which an LO light is time delayed from the minimum delay value to the maximum delay value MaxD. When the delay period MaxT is equal to the maximum delay value MaxD—the minimum delay value, the unit delay period interT may be determined as the unit delay value gapD.

For example, when the delay period MaxT is 2.66 μs, the maximum delay value MaxD is 1.33 μs, the minimum delay value is 0, and the unit delay value gap D is 0.66 ns, the unit delay period interT may be determined as 1.32 ns (=2.66 µs/1.33 µs*0.66 ns). As another example, when the delay period MaxT and the maximum delay value MaxD are 1.33 µs, the minimum delay value is 0, and the unit delay value gap D is 0.66 ns, the unit delay period interT may be determined as 0.66 ns (=1.33 µs/1.33 µs*0.66 ns).

Therefore, in order to increase the unit delay period interT, it may be necessary to increase the delay period MaxT, decrease the maximum delay value MaxD, increase the minimum delay value, or increase the unit delay value gapD.

Figure 9:
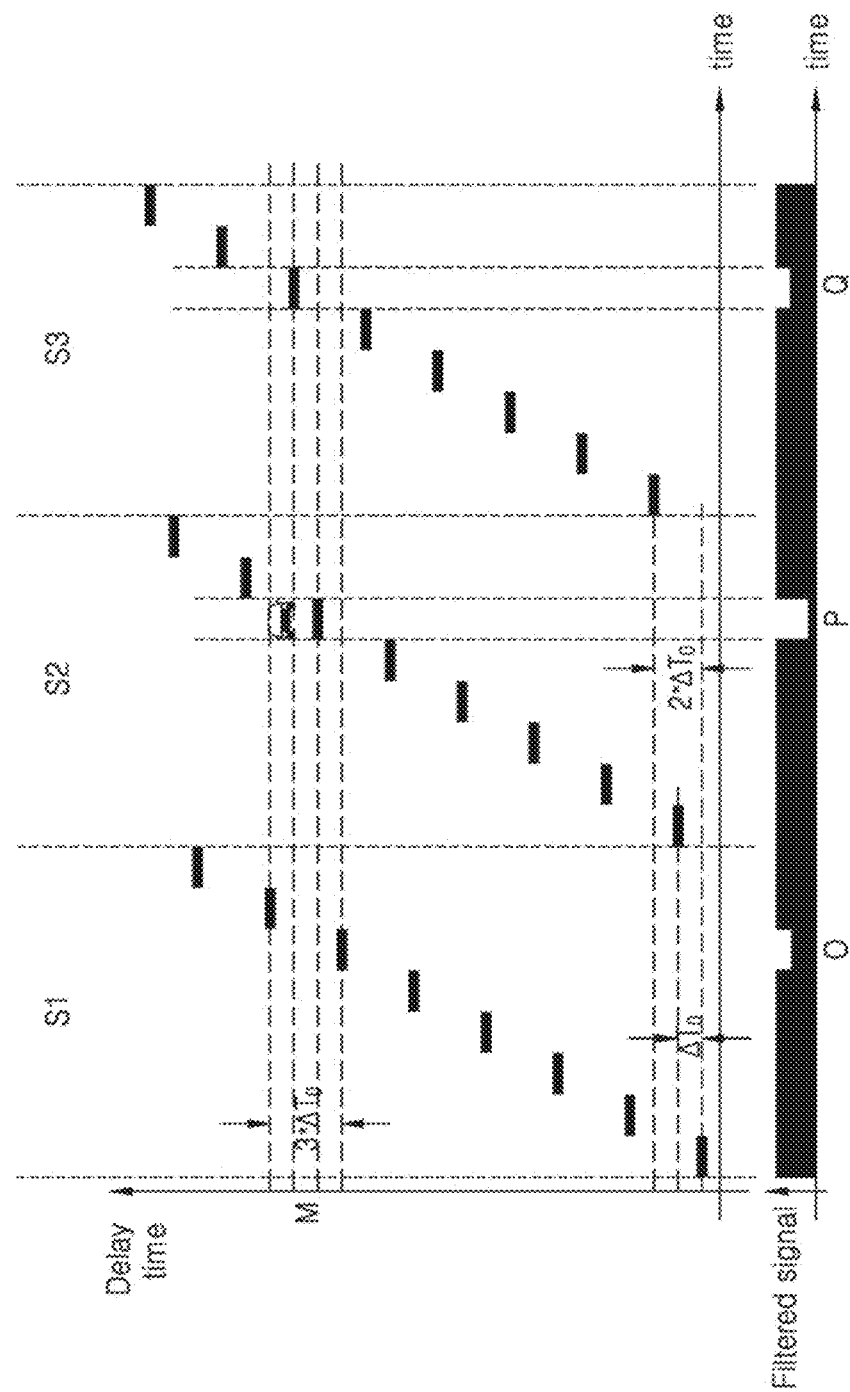
FIG. 9 is a diagram illustrating a method, performed by a LiDAR device, of measuring a distance according to an example embodiment.

FIG. 9 is a diagram illustrating a method, performed by a LiDAR device, of measuring a distance according to an example embodiment.

In an example embodiment, the LiDAR device may perform a delay operation of delaying an LO light multiple times with a time delay value increasing by a unit delay value from a minimum delay value to a maximum delay value. At least one of a minimum delay value and a maximum delay value of one delay operation may be different from a corresponding value of another delay operation.

The LiDAR device may determine the distance to an object from a time delay value corresponding to a period in which a filtered signal corresponding to the delay operation multiple times is reduced.

In an example embodiment, the LiDAR device is configured to use the increased unit delay value to increase a unit delay period. Specifically, when the minimum unit delay value satisfying the distance resolution ΔR of the LiDAR device is $\Delta T_0 (=2*\Delta R/c)$, in an example embodiment, the LiDAR device is configured to use a unit delay value greater than a minimum unit delay value $\Delta T_0$.

Referring to FIG. 9, in an example embodiment, the LiDAR device time delays the LO light by using $3*\Delta T_0$ (=6*ΔR/c), which is three times the minimum unit delay value $\Delta T_0$, as the unit delay value. Specifically, the LiDAR device increases the time delay value by $3*\Delta T_0$ from the first minimum delay value $\Delta T_0$ in a first delay operation S1, increases the time delay value by $3*\Delta T_0$ from a second minimum delay value $\Delta 2*T_0$ in a second delay operation S2, and increases the time delay value by $3*\Delta T_0$ from a third minimum delay value $\Delta 3*T_0$ in a third delay operation S3.

For example, when the distance resolution ΔR of the LiDAR device is 10 cm, because the minimum unit delay value $\Delta T_0$ corresponding to the distance resolution ΔR is 0.66 ns, 1.98 ns (=0.66 ns*3) is three times the minimum unit delay value $\Delta T_0$. In the first delayed operation S1, the time delay value increases to 0.66 ns, 2.64 ns (=0.66 ns+3*0.66 ns), 4.62 ns (=0.66 ns+6*0.66 ns). In the second delay operation S2, the time delay value increases to 1.32 ns (=2*0.66 ns), 3.3 ns (=2*0.66 ns+3*0.66 ns), 5.28 ns (=2*0.66 ns+6*0.66 ns). In the third delay operation S3, the time delay value increases to 1.98 ns (=3*0.66 ns), 3.96 ns (=3*0.66 ns+3*0.66 ns), 5.94 ns (=3*0.66 ns+6*0.66 ns).

In general, when the unit delay value that is N times the minimum unit delay value $\Delta T_0$ is used, the LiDAR device may increase the time delay value by the first minimum delay value $N*\Delta T_0$ in the first delay operation S1, increase the time delay value from the second minimum delay value $\Delta 2*T_0$ by $N*\Delta T_0$ in the second delay operation S2, and increase the time delay value from an Nth minimum delay value by $N*\Delta T_0$ in an Nth delay operation. In this case, the Nth minimum delay value may be $N*\Delta T_0$, but is not limited thereto.

As discussed with reference to FIG. 8, the unit delay period may be proportional to the unit delay value. Accordingly, the unit delay value increases by N times and thus, the unit delay period may increase by N times.

In each delayed operation, $N*\Delta T_0$ is used as the unit delay value, but considering the entire delay operations S1 to S3, the unit delay value is actually $\Delta T_0$. Accordingly, the unit delay period may increase N times while satisfying the distance resolution ΔR of the LiDAR device.

The processor may determine the distance to the object based on the filtered signal generated from the entire delay operation S1 to S3. The processor may detect the period in which the filtered signal is most reduced (e.g., time period L) to determine the distance to the object.

In FIG. 9, the processor may obtain a time delay value M corresponding to a period P in which the filtered signal is most reduced among periods O, P, and Q in which the filtered signal is reduced and determine the distance to the object. For example, the processor may detect a first delay time during which the filtered signal has a first local minimum value in the first delay operation S1, a second delay time during which the filtered signal has a second local minimum in the second delay operation S2, and a third local minimum during which the filtered signal has a third local minimum value in the third delay operation S3. The processor may select a global minimum value (e.g., the value of the filtered signal during the period P) from the first local minimum value (e.g., the value of the filtered signal during the period O), the second local minimum value (e.g., the value of the filtered signal during the period P), and the third local minimum value (e.g., the value of the filtered signal during the period Q), and may determine the distance from the LiDAR device to the object based the time delay value corresponding to the global minimum value (e.g., the time delay value M corresponding to the period P).

Figure 10:
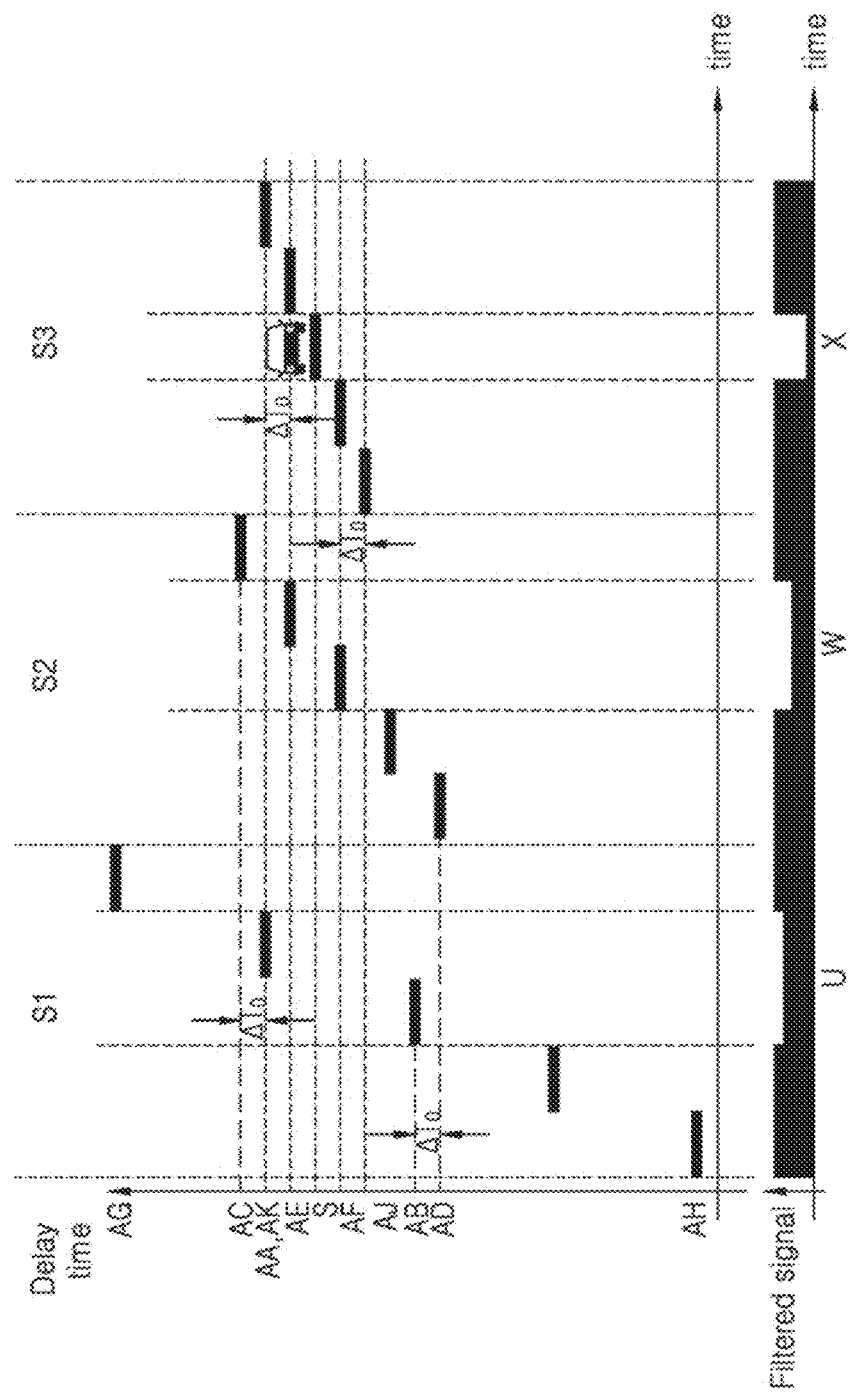
FIG. 10 is a diagram illustrating a method, performed by a LiDAR device, of measuring a distance according to an example embodiment.

FIG. 10 is a diagram illustrating a method, performed by a LiDAR device, of measuring a distance according to an example embodiment.

In an example embodiment, the LiDAR device may perform a delay operation of delaying an LO light multiple times with a time delay value increasing by a unit delay value from a minimum delay value to a maximum delay value. At least one of a minimum delay value, a maximum delay value, and a unit delay value of one delay operation may be different from a corresponding value of another delay operation.

The LiDAR device may reduce the maximum delay value, increase the minimum delay value, and perform the delay operation multiple times. In other words, the LiDAR device may reduce the range of the time delay value and perform the delay operation multiple times.

The LiDAR device may reduce the unit delay value and perform the delay operation multiple times. In other words, the LiDAR device may gradually reduce the time delay value and perform the delay operation multiple times.

Referring to FIG. 10, in an example embodiment, a delay circuit time delays the LO light with the time delay value increasing by a first unit delay value $6*\Delta T_0$ from a first minimum delay value AH to a first maximum delay value AG in the first delay operation S1. At this time, $\Delta T_0 (=2*\Delta R/c)$ is the minimum unit delay value that satisfies the distance resolution ΔR of the LiDAR device.

The processor obtains time delay values AA and AB corresponding to a period U in which the filtered signal corresponding to the first delay operation S1 is most reduced.

The processor may determine a second minimum delay value AD and a second maximum delay value AC from the obtained time delay values AA and AB. For example, the processor may determine the second minimum delay value AD by decreasing the time delay value AB by the minimum unit delay value $\Delta T_0$, and may determine the second maximum delay value AC by increasing the time delay value AA by the minimum unit delay value $\Delta T_0$.

The delay circuit time delays the LO light with the time delay value that increases by a second unit delay value $2*\Delta T_0$ from the second minimum delay value AD to the second maximum delay value AC in the second delay operation S2. The second unit delay value may be a value less than the first unit delay value. In an example embodiment, the second unit delay value $2*\Delta T_0$ is ⅓ times the first unit delay value $6*\Delta T_0$, but this is an exemplary value and is not limited thereto. In an example embodiment, the second unit delay value $2*\Delta T_0$ is twice the minimum unit delay value $\Delta T_0$, but this is an exemplary value and is not limited thereto.

The processor obtains time delay values AE and AF corresponding to a period W in which the filtered signal corresponding to the second delay operation S2 is most reduced.

The processor may determine a third minimum delay value AJ and a third maximum delay value AK from the obtained time delay values AE and AF. For example, the processor may determine the third minimum delay value AJ by decreasing the time delay value AF by the minimum unit delay value $\Delta T_0$, and may determine third maximum delay value AK by increasing the time delay value AE by the minimum unit delay value $\Delta T_0$.

The delay circuit time delays the LO light with the time delay value that increases by a third unit delay value $\Delta T_0$ from the third minimum delay value AJ to the third maximum delay value AK in the third delay operation S3. The third unit delay value may be a value less than the second unit delay value. In an example embodiment, the third unit delay value $\Delta T_0$ is ½ times the second unit delay value $2*\Delta T_0$, but this is an exemplary value and is not limited thereto. In an example embodiment, the third unit delay value $\Delta T_0$ is the same as the minimum unit delay value $\Delta T_0$, but this is an exemplary value and is not limited thereto.

The processor may obtain a time delay value S corresponding to a period X in which the filtered signal corresponding to the third delay operation S3 is reduced and determine the distance to an object.

As described with reference to FIG. 8, when the maximum delay value—the minimum delay value decreases or the unit delay value increases, a unit delay period may increase.

In the first delayed operation S1, because the increased unit delay value is used, the unit delay period may increase. In the second delayed operation S2, because the increased unit delay value and the maximum and minimum delay values in which a difference is reduced are used, the unit delay period may increase. In the third delay operation S3, because the maximum and minimum delay values in which a difference is reduced are used, the unit delay period may increase.

Further, the unit delay value in the final delay operation S3 is $\Delta T_0$. Accordingly, while satisfying the distance resolution $\Delta R$ of the LiDAR device, the distance to the object may be detected with the increased unit delay period.

Figure 11:
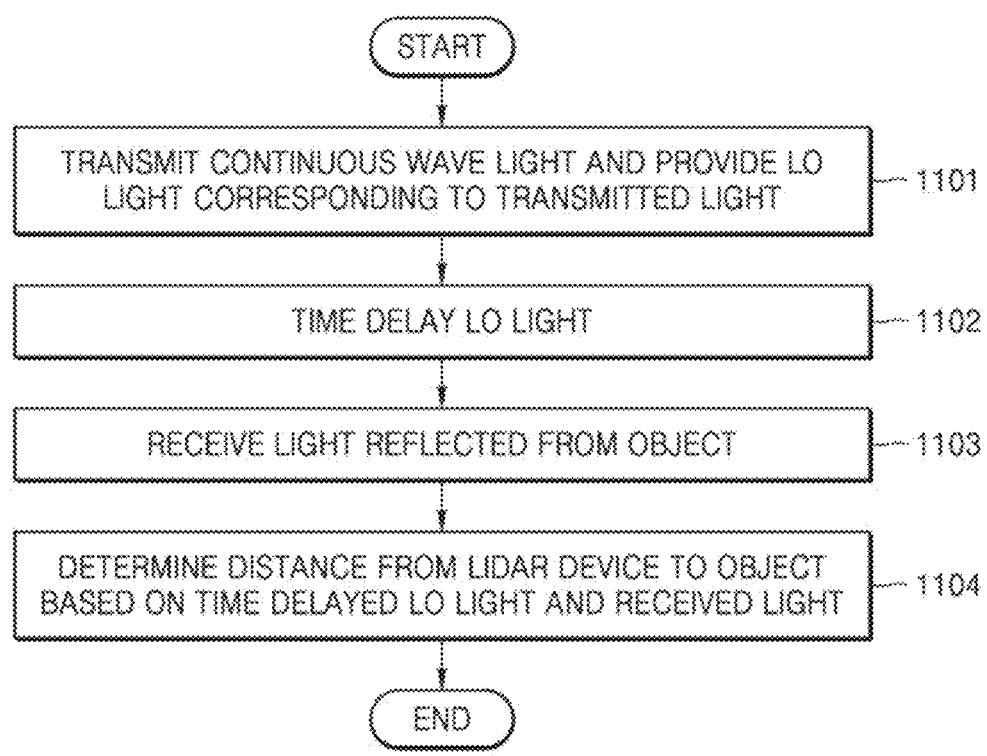
FIG. 11 is a flowchart illustrating an operating method of a LiDAR device according to an example embodiment.

FIG. 11 is a flowchart illustrating an operating method of a LiDAR device according to an example embodiment.

Referring to FIGS. 1 and 11, in operation 1101, the transmitter 110 may transmit a continuous wave light and provide the LO light 12 corresponding to the transmitted light 11.

In operation 1102, the delay circuit 130 may time delay the LO light 12. The delay circuit 130 may provide the time delayed LO light 13 to the detection circuit 140.

In operation 1103, the receiver 120 may receive the light 14 reflected from the object 1. The receiver 120 may provide the received light 15 to the detection circuit 140.

In operation 1104, the detection circuit 140 may determine a distance from the LiDAR device to the object 1 based on the time delayed LO light 12 and the received light 15. The detection circuit 140 may determine the distance to the object 1 by analyzing an electrical signal obtained from a light interfered with the time delayed LO light 12 and the received light 15 in a time domain.

Figure 12:
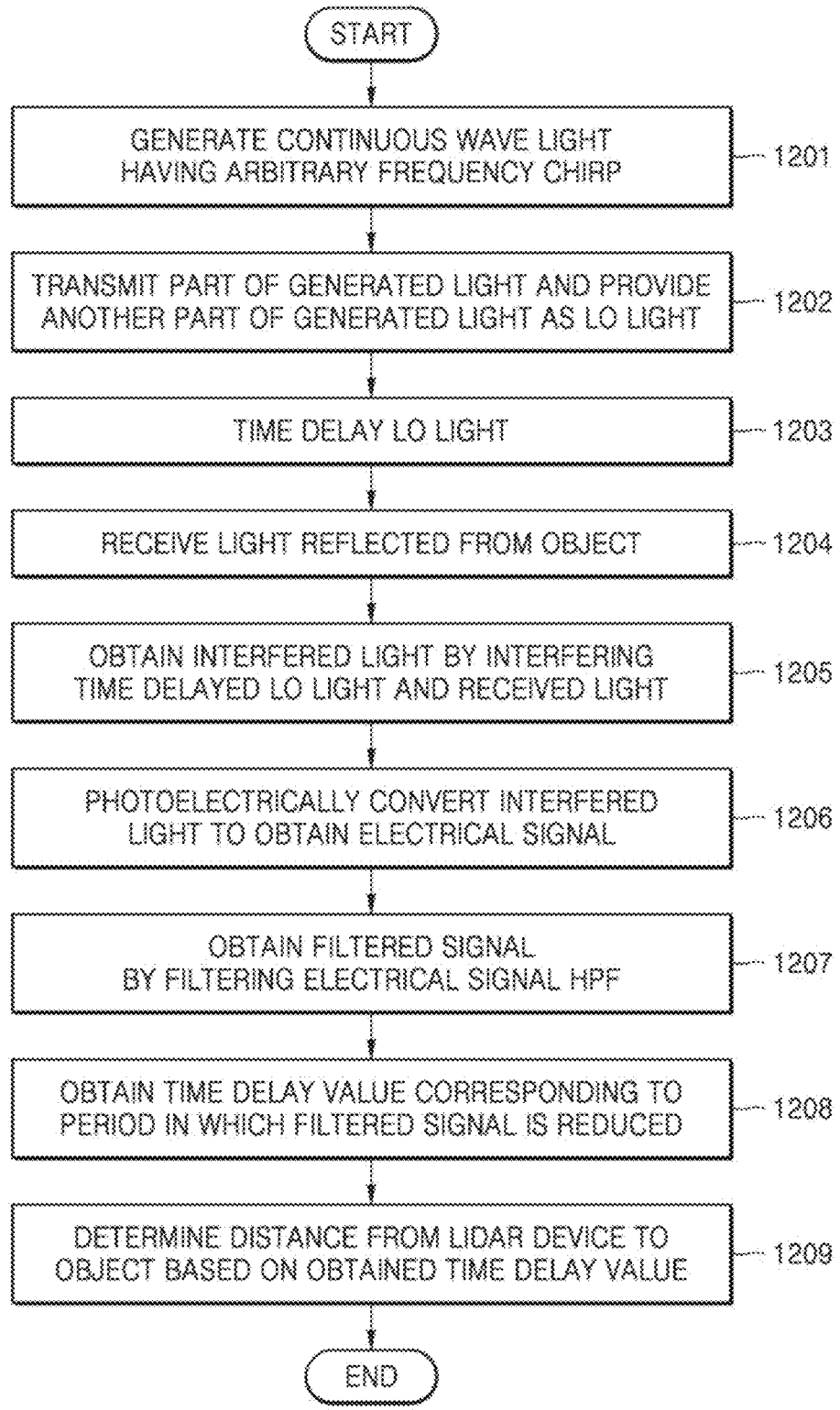
FIG. 12 is a flowchart illustrating an operating method of a LiDAR device according to an example embodiment.

FIG. 12 is a flowchart illustrating an operating method of a LiDAR device according to an example embodiment.

Referring to FIGS. 2 and 12, in operation 1201, the light source 212 may generate a continuous wave light having an arbitrary frequency chirp. The frequency modulator 211 may control the light source 212 such that the light generated from the light source 212 is an arbitrary frequency chirp signal.

In operation 1202, the splitter 213 and the transmission antenna 214 may transmit part of the generated light and provide another part of the generated light as the LO light 22. Specifically, light generated by the light source 212 splits into a transmission light and the LO light 22 by the splitter 213, and the light may be transmitted by the transmission antenna 214.

In operation 1203, the delay circuit 230 may time delay the LO light 22. The delay circuit 230 may provide the time delayed LO light 23 to the mixer 241 by delaying the LO light 22 with a changed time delay value.

In operation 1204, the reception antenna 220 may receive the light 24 reflected from the object 2.

In operation 1205, the mixer 241 may obtain the interfered light 26 by interfering the time delayed LO light 23 and the received light 25.

In operation 1206, the signal converter 242 photoelectrically converts the interfered light 26 to obtain the electrical signal 27.

The processor 243 may obtain a filtered signal by filtering the electrical signal 27 with a high-pass filter (HPF) in operation 1207, obtain a time delay value corresponding to a period in which the filtered signal is the smallest in operation 1208, and obtain a distance from the LiDAR device to the object 2 based on the obtained time delay value in operation 1209.

Figure 13:
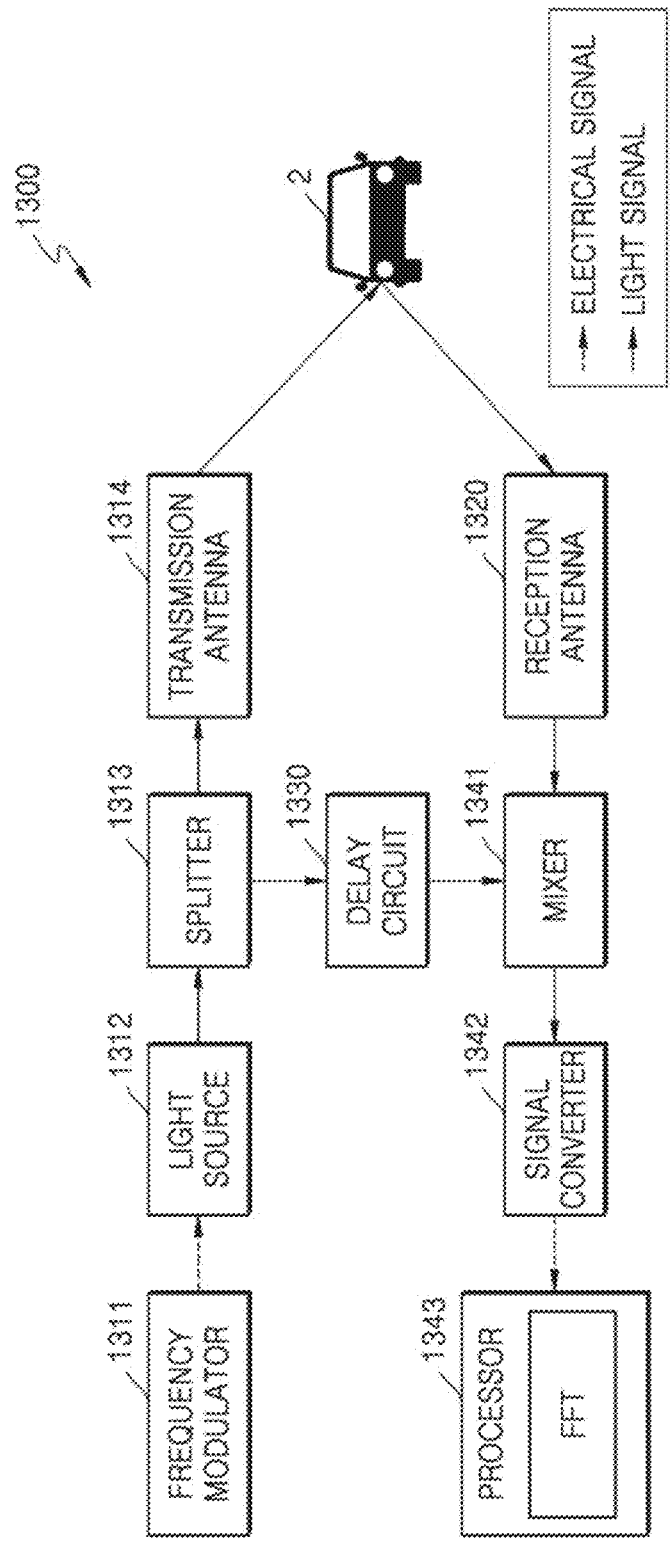
FIG. 13 is a block diagram illustrating a LiDAR device according to an example embodiment.

FIG. 13 is a block diagram illustrating a LiDAR device 1300 according to an example embodiment.

The LiDAR device 1300 of FIG. 13 differs from the LiDAR device 200 of FIG. 2 in that the processor 1343 is configured to analyze signals in a time domain and a frequency domain. Accordingly, the configurations illustrated in FIG. 14 may be configured to perform the same or similar functions as the configurations illustrated in FIG. 2.

The processor 1343 may be configured to determine a distance to the object 2 by analyzing an electrical signal provided from the signal converter 1342 in the time domain, and to determine the speed of the object 2 by analyzing the electrical signal in the frequency domain.

The processor 1343 may include a filter analyzing the electric signal in the time domain and an FFT circuit analyzing the electric signal in the frequency domain.

Figure 14:
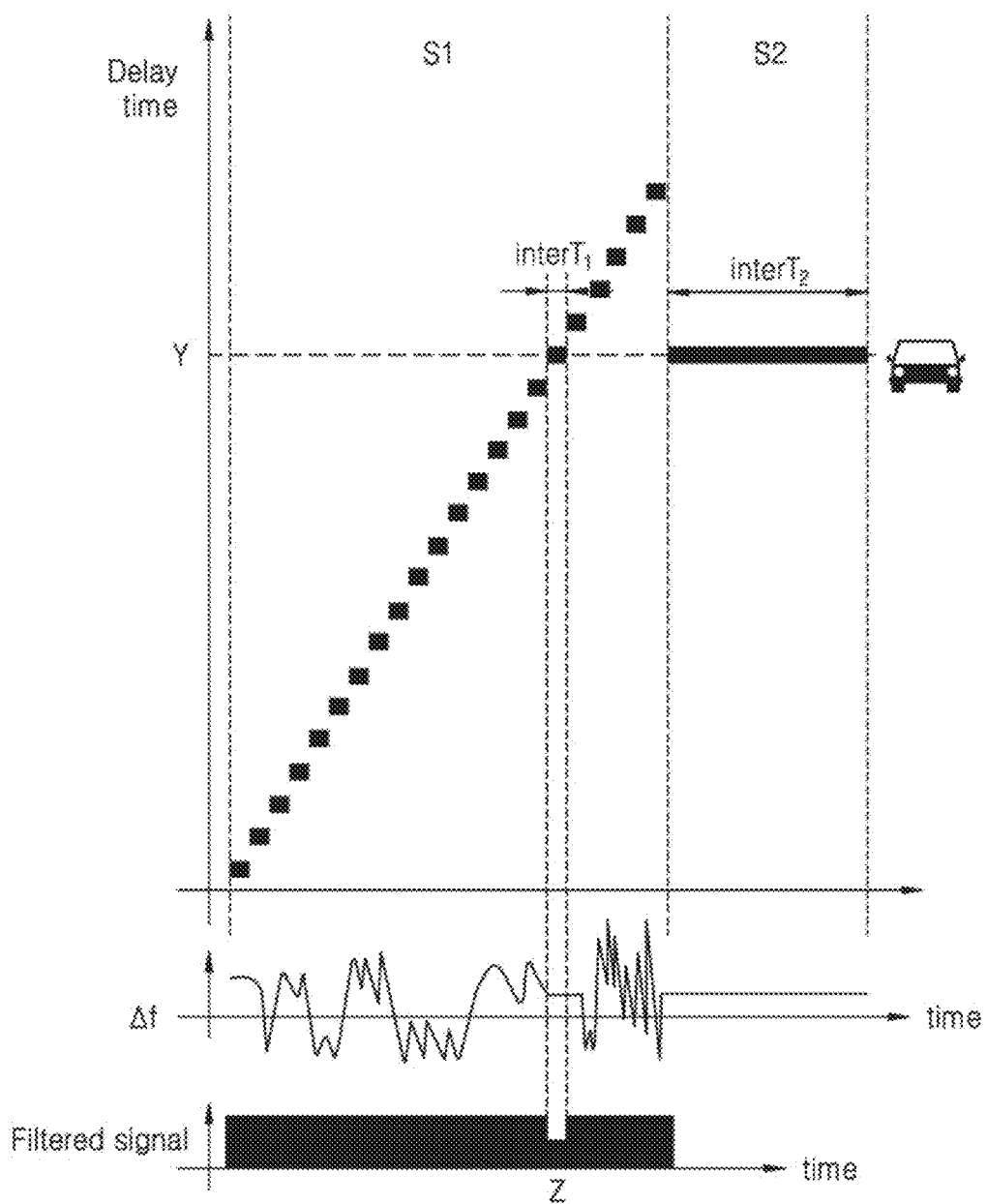
FIG. 14 is a diagram illustrating a method, performed by a LiDAR device, of detecting a speed and a distance according to an example embodiment.

FIG. 14 is a diagram illustrating a method, performed by the LiDAR device, of detecting a speed and a distance according to an example embodiment.

Referring to FIGS. 13 and 14, the LiDAR device 1300 may determine the distance to an object based on the first delay operation S1 and determine the speed of the object based on the second delay operation S2.

The method, performed by the LiDAR device 1300, of determining the distance to the object based on the first delay operation S1 may be the same as the method described with reference to FIGS. 1 to 12 above. Specifically, the processor 1343 may determine the distance to the object from a time delay value Y corresponding to a period Z in which a filtered signal is reduced.

The delay circuit 1330 may time delay an LO light by the time delay value Y in the second delay operation S2.

The mixer 1341 may provide an interfered light to the signal converter 1342 by interfering a received light with the time delayed LO light by the time delay value Y.

The signal converter 1342 may convert the interfered light into an electrical signal to provide the electrical signal to the processor 1343.

The processor 1343 may obtain the beat frequency $\Delta f$ from the electric signal using an FFT circuit and determine the speed of the object from the beat frequency $\Delta f$ based on the Doppler effect.

A second unit delay period $interT_2$ of the second delay operation S2 may be larger than a first unit delay period $interT_1$ of the first delay operation S1. The second unit delay period $interT_2$ may be a period sufficient to analyze a component of the beat frequency $\Delta f$.

For example, when the object moves at a speed of 200 km/h, the Doppler frequency calculated from the speed of the object is about 42.4 MHz. The second unit delay period $interT_2$ may be determined to be about 94 ns (=1/(42.4 MHz/4)) to obtain an electrical signal of the Doppler frequency of 4 cycles.

For example, when the object moves at a speed of Mach 1.0, the Doppler frequency calculated from the speed of the object is about 943 MHz. The second unit delay period $interT_2$ may be determined to be about 6 ns (=1/(943 MHz/6)) to obtain an electric signal of the Doppler frequency of 6 cycles.

FIG. 15 is a flowchart illustrating method, performed by the LiDAR device, of detecting a speed and a distance according to an example embodiment Referring to FIGS. 13 and 15, in operation 1501, the transmission antenna 1314 transmits a continuous wave light, and the splitter 1313 may provide an LO light corresponding to the transmitted light. The frequency modulator 1311 may control the light source 1312 such that a light generated from the light source 1312 is an arbitrary frequency chirp signal.

In operation 1502, the delay circuit 1330 may time delay the LO light. The delay circuit 1330 may time delay the LO light by using a time delay value increasing by a unit delay value from a minimum delay value to a maximum delay value. For example, the delay circuit 1330 may increase the time delay value of the LO light by using a time delay value in a stepwise manner.

In operation 1503, the reception antenna 1320 may receive light reflected from an object.

In operation 1504, the processor 1343 may determine a distance to the object based on the time delayed LO light and a received light, and obtain a time delay value corresponding to the distance to the object.

In operation 1505, the transmission antenna 1314 may transmit the continuous wave light, and the splitter 1313 may provide the LO light corresponding to the transmitted light.

In operation 1506, the delay circuit 1330 may time delay the LO light based on the time delay value obtained by the processor 1343.

In operation 1507, the reception antenna 1320 may receive light reflected from the object.

In operation 1508, the processor 1343 may determine the speed of the object based on the time delayed LO light and the received light. The processor 1343 may determine the speed of the object by analyzing components of the bit frequency of the time delayed LO light and the received light.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LiDAR) device comprising:
   a transmitter configured to transmit a continuous wave light to an object, and provide a local oscillator (LO) light corresponding to the transmitted continuous wave light;
   a delay circuit configured to delay the LO light;
   a receiver configured to receive the continuous wave light reflected from the object; and
   a detection circuit configured to determine a distance from the LiDAR device to the object based on the time delayed LO light and the received continuous wave light,
   wherein the detection circuit further comprises a mixer configured to output an interfered light by interfering the time delayed LO light with the received continuous wave light, a signal converter configured to output an electrical signal by photoelectrically converting the interfered light, and a processor configured to determine the distance from the LiDAR device to the object based on the electrical signal, and
   wherein the processor is configured to generate a filtered signal by filtering the electrical signal via a high pass filter (HPF), obtain a time delay value of the time delayed LO light corresponding to a period in which the filtered signal is reduced to a predetermined value or a minimum value, and determine the distance from the LiDAR device to the object based on the obtained time delay value.

2. The LiDAR device of claim 1, wherein the delay circuit is further configured to change an amount of a time delay by which the LO light is delayed.

3. The LiDAR device of claim 1, wherein the delay circuit is further configured to stepwise increase an amount of a time delay by which the LO light is delayed, from a minimum delay value to a maximum delay value.

4. The LiDAR device of claim 1, wherein the continuous wave light comprises a non-linear frequency modulated continuous wave light, and
wherein the transmitter comprises:
a light source; and
a frequency modulator configured to control the light source to generate a frequency chirp signal including the non-linear frequency modulated continuous wave light.

5. The LiDAR device of claim 1, wherein the transmitter further comprises a light source configured to generate a light, and a splitter configured to split the light generated by the light source into the continuous wave light and the LO light and provide the LO light to the delay circuit.

6. An operating method of a light detection and ranging (LiDAR) device, the operating method comprising:
transmitting a continuous wave light to an object and providing a local oscillator (LO) light corresponding to the transmitted continuous wave light;
time delaying the LO light;
receiving the continuous wave light reflected from the object; and
determining a distance from the LiDAR device to the object based on the time delayed LO light and the received continuous wave light,
wherein the determining the distance from the LiDAR device to the object comprises:
obtaining an interfered light by interfering the time delayed LO light with the received continuous wave light;
obtaining an electrical signal by photoelectrically converting the interfered light; and
determining the distance from the LiDAR device to the object based on the electrical signal, by obtaining a filtered signal by filtering the electrical signal, and determining the distance from the LiDAR device to the object based on the filtered signal,
wherein the determining the distance from the LiDAR device to the object based on the filtered signal comprises:
obtaining a time delay value of the time delayed LO light corresponding to a period in which the filtered signal is reduced to a predetermined value or a minimum value; and
determining the distance from the LiDAR device to the object from the obtained time delay value.

7. The operating method of claim 6, wherein the time delaying the LO light comprises:
time delaying the LO light by changing an amount of a time delay by which the LO light is delayed.

8. The operating method of claim 6, wherein the time delaying the LO light comprises:
time delaying the LO light by stepwise increasing an amount of a time delay by which the LO light is delayed, from a minimum delay value to a maximum delay value.

9. The operating method of claim 6, wherein the time delaying the LO light comprises:
performing a plurality of delay operations on the LO light with a time delay value increasing by a unit delay value from a minimum delay value to a maximum delay value, and
wherein at least one of the minimum delay value, the maximum delay value, and the unit delay value of a delay operation of the plurality of delay operations is different from at least one of the minimum delay value, the maximum delay value, and the unit delay value of another delay operation of the plurality of delay operations.

10. The operating method of claim 6, wherein the time delaying the LO light comprises:
time delaying the LO light with a first time delay value increasing by a unit delay value from a first minimum delay value to a first maximum delay value; and
time delaying the LO light in time with a second time delay value increasing by the unit delay value from a second minimum delay value to a second maximum delay value, and
wherein the unit delay value is proportional to a difference between the first minimum delay value and the second minimum delay value.

11. The operating method of claim 6, wherein the time delaying the LO light comprises:
time delaying the LO light by a first time delay value increasing by a first unit delay value from a first minimum delay value to a first maximum delay value; and
time delaying the LO light by a second time delay value increasing by a second unit delay value from a second minimum delay value to a second maximum delay value, and
wherein a second difference between the second maximum delay value and the second minimum delay value is less than a first difference between the first maximum delay value and the first minimum delay value, or the second unit delay value is less than the first unit delay value.

12. The LiDAR device of claim 1, wherein:
the detection circuit is further configured to determine a speed of the object based on a time delay value of the time delayed LO light and the received continuous wave light.

13. A light detection and ranging (LiDAR) device comprising:
a light source;
a frequency modulator configured to control the light source to produce a non-linear continuous wave light;
a beam splitter configured to split the non-linear continuous wave light into a transmission light and a local oscillator (LO) light;
an optical delay circuit configured to time delay the LO light by stepwise increasing a delay time of the LO light;
one or more antennas configured to emit the transmission light to an object and receive a reflected light from the object when the transmission light is reflected from the object; and
a detection circuit configured to determine a distance from the LiDAR device to the object based on the time delayed LO light and the reflected light,
wherein the optical delay circuit is further configured to:
perform a first delay operation, a second delay operation, and a third delay operation on the LO light by stepwise increasing the delay time by a first unit time, a second unit time, and a third unit time, respectively, and output an interfered light by interfering the time delayed LO light with the reflected light, and wherein the LiDAR device further comprises a processor configured to:

detect a first delay time during which the interfered light has a first local minimum value in the first delay operation, a second delay time during which the interfered light has a second local minimum value in the second delay operation, and a third delay time during which the interfered light has a third local minimum value in the third delay operation;

determine a global minimum value from the first local minimum value, the second local minimum value, and the third local minimum value, and determine the distance from the LiDAR device to the object based the first delay time, the second delay time, or the third delay time during which the global minimum value is obtained.

14. The LiDAR device of claim 13, wherein the first unit time, the second unit time, and the third unit time are equal to each other, and wherein the optical delay circuit is further configured to:
perform the first delay operation from a first minimum delay value to a first maximum delay value;
perform the second delay operation from a second minimum delay value to a second maximum delay value; and
perform the third delay operation from a third minimum delay value to a third maximum delay value, and wherein the first minimum delay value, the second minimum delay value, the third minimum delay value are different from each other, and wherein the first maximum delay value, the second maximum delay value, and the third maximum delay value are different from each other.

15. The LiDAR device of claim 13, wherein the first unit time, the second unit time, and the third unit time are different from each other, and wherein the optical delay circuit is further configured to:
perform the first delay operation from a first minimum delay value to a first maximum delay value;
perform the second delay operation from a second minimum delay value to a second maximum delay value; and
perform the third delay operation from a third minimum delay value to a third maximum delay value, and wherein a second range from the second minimum delay value to the second maximum delay value is within a first range from the first minimum delay value to the first maximum delay value, and a third range from the third minimum delay value to the third maximum delay value is within the second range.

* * * * *